United States Patent [19]

Miyazaki et al.

[11] Patent Number: 5,469,616

[45] Date of Patent: Nov. 28, 1995

[54] METHOD OF MANUFACTURING A SIDE RAIL OF A COMBINED OIL RING

[75] Inventors: Satomichi Miyazaki; Akira Harayama; Nobuyuki Kazama; Masao Ishida, all of Nagano, Japan

[73] Assignee: Teikoku Piston Ring Co., Ltd., Tokyo, Japan

[21] Appl. No.: 189,723

[22] Filed: Jan. 31, 1994

Related U.S. Application Data

[63] Continuation-in-part of Ser. No. 791,257, Nov. 13, 1991, abandoned.

[30] Foreign Application Priority Data

| Nov. 15, 1990 | [JP] | Japan | 2-309452 |
| Jun. 10, 1991 | [JP] | Japan | 3-165012 |
| Aug. 14, 1991 | [JP] | Japan | 3-228817 |

[51] Int. Cl.⁶ .................................................. B23P 15/00
[52] U.S. Cl. .................................. 29/888.074; 29/888.07; 29/888.076
[58] Field of Search .................. 29/888.07, 888.073, 29/888.074, 888.076; 277/139, 140, 216, 235 A

[56] References Cited

U.S. PATENT DOCUMENTS

| 1,435,592 | 11/1922 | Marson . |
| 2,137,737 | 11/1938 | Wenzel . |
| 2,436,227 | 2/1948 | Phillips . |
| 2,518,253 | 8/1950 | Reis . |
| 2,807,511 | 9/1957 | Fleming . |
| 2,905,512 | 9/1959 | Anderson . |
| 2,919,486 | 1/1960 | Banquarel . |
| 3,323,807 | 6/1967 | Vanderbilt, Jr. . |
| 3,364,547 | 1/1968 | Prasse . |
| 3,650,537 | 3/1972 | Sugahara . |
| 3,671,047 | 6/1972 | Umezawa . |
| 3,806,139 | 4/1974 | Suzuki et al. . |
| 4,579,355 | 4/1986 | Kooroki . |
| 4,612,260 | 9/1986 | Kumagai et al. . |
| 5,037,115 | 8/1991 | Brandon . |
| 5,161,805 | 11/1992 | Watanabe et al. . |

FOREIGN PATENT DOCUMENTS

| 2069162 | 9/1971 | France . |
| 57-61888 | 12/1982 | Japan . |
| 58-136771 | 8/1983 | Japan . |
| 60-153455 | 8/1985 | Japan . |
| 60-153456 | 8/1985 | Japan . |
| 62-167977 | 7/1987 | Japan . |
| 62-188856 | 8/1987 | Japan . |
| 63-34343 | 3/1988 | Japan . |
| 1-178274 | 12/1989 | Japan . |
| 2-129467 | 5/1990 | Japan . |
| 2-154865 | 6/1990 | Japan . |
| 2-72863 | 6/1990 | Japan . |
| 3-79864 | 4/1991 | Japan . |
| 4-64 | 1/1992 | Japan . |
| 5-332451 | 12/1993 | Japan . |
| 605667 | 7/1948 | United Kingdom . |
| 749358 | 5/1956 | United Kingdom . |

OTHER PUBLICATIONS

Patent Abstracts of Japan, vol. 9, No. 261 (M–422)[1984] Oct. 18, 1985 of Japanese Published Application 60–108551 of Jun. 14, 1985.

*Primary Examiner*—Irene Cuda
*Attorney, Agent, or Firm*—Hill, Steadman & Simpson

[57] ABSTRACT

Each side rail of a combined oil ring, which includes a spacer-expander and two side rails, has an ion nitriding treatment layer on an outer peripheral surface of the rail. The inner peripheral surface of each rail may either be a bare surface or have either a soft surface treatment or a hard chrome plating. The upper and lower surfaces of the rail may either be a bare surface or have a soft surface treatment. The method comprises coiling a strip to form a coil, placing the coil on a jig so that only the outer peripheral surface is exposed to the ion nitriding and then cutting the coil to form the individual rails with a gap.

2 Claims, 4 Drawing Sheets

METHOD OF MANUFACTURING A SIDE RAIL OF A COMBINED OIL RING

CROSS-REFERENCE TO RELATED APPLICATIONS

This is a continuation-in-part of U.S. patent application Ser. No. 07/791,257 filed Nov. 13, 1991.

BACKGROUND OF THE INVENTION

1. Field of the Invention

The present invention relates to a method of manufacturing side rails for a combined oil ring, which is principally used in an internal combustion engine, and has a pair of side rails separated by a space expander which forces the pair of rails to scrape off surplus oil on an inner wall of a cylinder.

2. Description of the Related Art

With the recent trend toward higher loads in an internal combustion engine, a nitriding treatment has been applied to a side rail of a combined oil ring made of steel (see Japanese Patent Publication No. 61888/1982 or Japanese Patent Laid-Open No. 136771/1983 publication). This treatment of the side rails will cause an abnormal abrasion phenomenon in an oil ring groove of a piston made of aluminum alloy in some engines which use lead-free gasoline. The cause of the abnormal abrasion of the oil ring groove is considered to be due to the following:

The hardness of a nitrided layer is too high as compared with the hardness of the aluminum alloy.

A combined oil ring is received in an oil ring groove of a piston, and a side rail will rotate about an axis while an end portion of the rail vibrates up and down.

When a relative rotation between the side rail and the oil ring groove is impaired for some reason, the wall surface of the oil ring groove sometimes becomes abnormally worn by a nitrided hard and sharp edge of the end portion or surface at a gap of the side rail.

The following measures have been taken with regard to a side rail in consideration of the above points:

(1) A chamfered portion is provided in the inner periphery of the side rail to reduce the friction during rotation within the oil ring groove (see Japanese Utility Model Laid-Open No. 34343/1988 publication).

(2) Smooth chamfers are applied to corner portions between an end surface of a gap of the rail and the upper and lower surfaces of the side rail (see Japanese Utility Model Laid-Open No. 178274/1989 publication).

(3) The end portions at the gap of the side rail are prevented from being nitrided (see Japanese Utility Model Laid-Open No. 72863/1990 publication).

However, when the nitriding treatment is applied to the upper and lower surfaces of the side rail, the above-described measures of (1) or (2) may sometimes be insufficient.

On the other hand, the nitriding treatment which is applied to a piston ring is carried out by gas nitriding method or salt-bath nitriding method. According to these methods, not only the outer peripheral surface but also the upper and lower surfaces and the inner peripheral surface become nitrided. Thus, all surfaces of the rail become nitrided as just mentioned. Therefore, when a thick nitriding is applied to a thin ring or rail, the brittleness increases with nitriding, and the breaking strength becomes materially lowered. This structure will not respond to the requirement of the thinner ring with a high abrasion resistance. Either unnecessary nitrided portion should be removed by machining after a nitriding treatment or an anti-nitriding treatment should be applied in order that the nitrided layers are not provided on the upper and lower surfaces of the side rail. These steps or treatments involve considerable disadvantages in terms of technique as well as cost.

In the anti-nitriding treatment described in the above-mentioned item (3), a plating of nickel, copper, etc., is applied to the end portion of the rail, which plating is a disadvantageously cumbersome step or process.

SUMMARY OF THE INVENTION

It is an object of the present invention to provide a method of manufacturing a side rail of a combined oil ring, which rail can respond to the requirements of a thinner ring and abrasion resistance and, in addition, can prevent an occurrence of abnormal abrasion of an oil ring groove.

A side rail of a combined oil ring according to the present invention is provided only on the outer peripheral surface with a nitrided layer. This nitrided layer is an ion nitrided layer. Upper and lower surfaces are either bare or uncoated surfaces or are formed with soft surface treatment layers. An inner peripheral surface is a bare surface or is formed with either a soft surface treatment layer or a hard chromium plating layer.

A method of manufacturing a side rail of a combined oil ring comprises the steps of coiling a side rail material into a coil, cutting the coil, applying an ion nitriding treatment before the cutting step to form a nitrided layer on only the outer peripheral surface of the rail, and then applying a finishing work to the side rail.

The aforementioned soft surface treatment is one surface treatment selected from a group of phosphate coating treatment, ferrox coating treatment, sulfide coating treatment, tin plating treatment, soft alloy plating treatment, copper plating treatment and resin fluoride coating treatment, or a composite coacting treatment composed of at least two surface treatments selected from this group.

Since only the outer peripheral surface of the side rail is provided with an ion nitrided layer, the abrasion resistance with respect to the sliding contact with the cylinder is good. Since the upper and lower surfaces are bare surfaces or are formed with soft surface treatment layers, the abnormal abrasion of the oil ring groove of the piston will hardly occur. When hard chrome plating is applied to the inner peripheral surface, the excellent abrasion resistance with respect to the sliding contact with the space expander or spacer-expander is obtained.

By the selection of the ion nitriding treatment, which has a selected direction of treatment as the nitriding treatment, the upper and lower surfaces and the inner surface of the side rail can be protected from contact with the ion nitriding material so that these surfaces are not nitrided. This prevention of nitriding is obtained without requiring a particular anti-nitriding treatment or removing work of a nitrided layer, and the nitriding can be easily applied to only the outer peripheral surface which is the only exposed surface. Since the nitriding can be applied to only the outer peripheral surface, and when a thick nitriding is applied to a ring which is thin in width, the breaking strength of the product will not be impaired and, thus, the product will meet the requirements of the thinner ring and abrasion resistance.

When a coil is ion nitrided only at an outer peripheral surface of the coil, the outer peripheral surface of the coil generates a longer elongation as compared with the inner peripheral surface of the coil, and this will result in a variation in the size of the outer diameter of the coil before nitriding and after nitriding so that the size of the outer diameter of the coil is substantially decreased after nitriding. In the case when all surfaces of the coil are nitrided, this phenomenon does not occur. This phenomenon is a problem, which is present only in the method of the present invention which method has nitriding at only the outer peripheral surface of the coil.

DESCRIPTION OF THE PREFERRED EMBODIMENTS

The aforesaid and other objects and features of the present invention will become further apparent from the ensuing detailed description and accompanying drawings.

Figure 7:
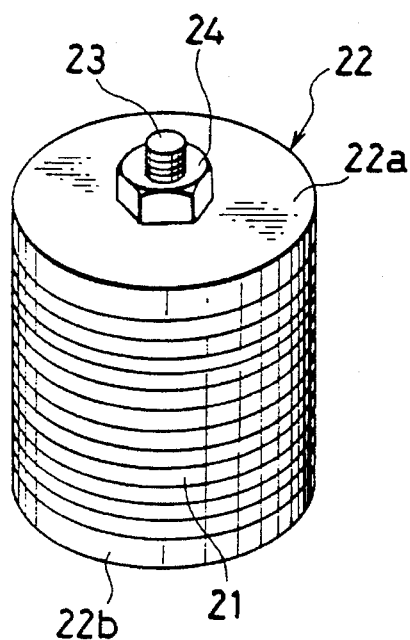
FIG. 7 is a perspective view showing a state in which a coil material is combined with a jig.

A strip of rail material of a martensitic stainless steel was coiled to form a coil 21. The coil 21 was set on the outer periphery of a cylindrical member of a jig 22 (FIG. 7). In the case that x represents an outer diameter of the outer peripheral surface of the jig 22, then x=(A+B)−C, wherein A is the outer diameter of the coil 21 after nitriding; B is the difference of the size of the outer diameter A' of the coil before nitriding and the diameter A after nitriding, i.e., B=A'−A; and C is twice the radial thickness of the coil (see FIG. 2). Clamp disks 22a and 22b of the jig 22 are disposed on opposite ends of the coil 21. A nut 24 is threadedly engaged with a tapped or threaded portion of a shaft portion 23 which extends from one clamp disk 22b and extends through a center hole of the other clamp disk 22a, and the nut 24 is axially tightened and fixed. Under the aforesaid condition (refer to FIG. 7), the coil 21 is set on the jig 22 in such a manner that the outer diameter of the coil 21 is the sum of the difference of the size of the outer diameter of the coil before nitriding and after nitriding and the size of the outer diameter of the coil required after nitriding. Then, the nitriding treatment was applied to the outer peripheral surface in an ion nitriding oven. The conditions of the ion nitriding treatment were, for example, as follows:

Composition of atmospheric gases:

Nitrogen:hydrogen=7:3,

Work temperature: 500° C.

An ion nitriding treatment layer having a depth of 60 μm with a hardness of Hv 700 or more was obtained.

Figure 8:
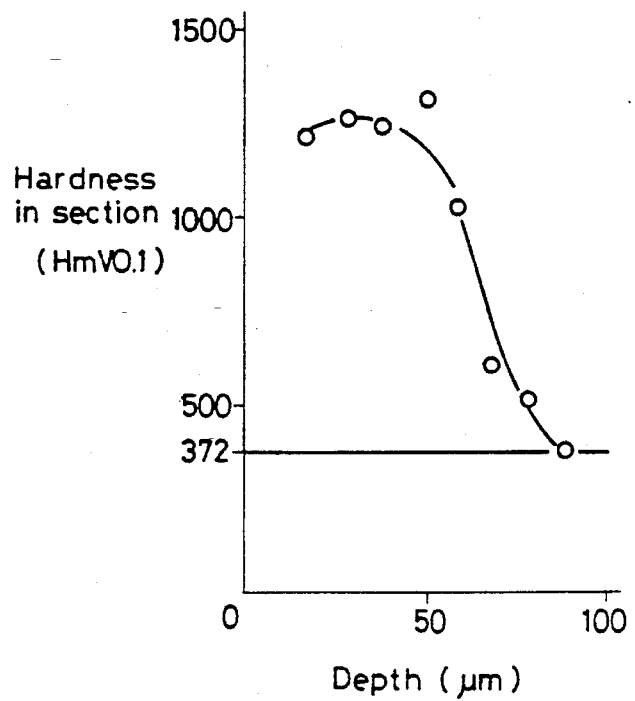
FIG. 8 is a graph showing the depthwise distribution of hardness of an ion nitriding treatment layer according to the present invention.

FIG. 8 shows the depthwise distribution of the hardness of the ion nitriding treatment layer. Since a discharge only occurs at the outer peripheral surface of each turn of the coil in the nitriding treatment, the outer peripheral surface of the side rail is nitrided, but since the upper and lower surfaces of adjacent turns of the coil have no clearance therebetween because of contact with each other and the inner peripheral surface is in contact with the cylindrical surface of the jig, no discharge occurs at these surfaces. Accordingly, it is possible to obtain a side rail in which the upper and lower surfaces and an inner peripheral surface are free from a nitrided layer.

After the ion nitriding treatment, the coil of material was removed from the jig 22. Because of the nitriding process, the coil removed from the jig after nitriding will have a reduced diameter and this diameter is a desired outer diameter for the rails. A hard chrome plating treatment was applied to only the inner peripheral surface in a conventional method. An inverse electrolysis treatment was applied to the hard chrome layer to create a porous layer with a surface roughness of 5 μm to 20 μm.

Thereafter, the workpiece was cut to form a side rail having a gap, and the upper and lower surfaces were formed with soft surface treatment layers.

Thereafter, the side rail was finished in a conventional method.

Figure 1:
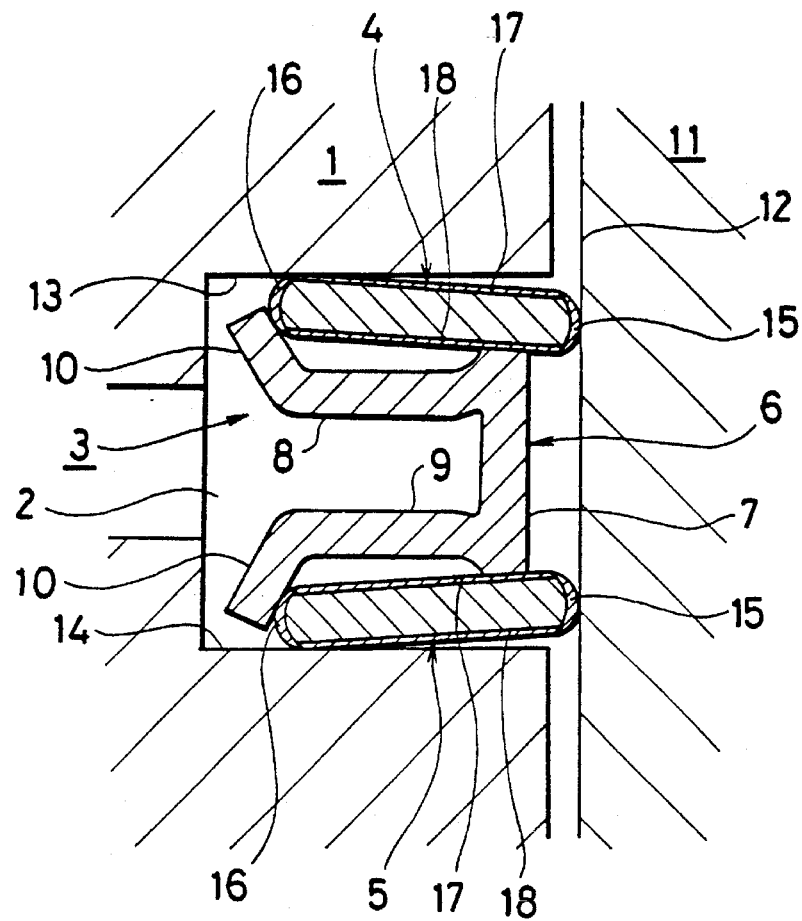
FIG. 1 is a longitudinal cross sectional view showing a combined oil ring made of steel according to the present invention which is fitted into an oil ring groove of a piston inserted into a cylinder.

FIG. 1 shows a combined oil ring, generally indicted at 3, and made of steel. The combined oil ring 3 is fitted into an oil ring groove 2 of a piston and is composed of a pair of upper and lower steel side rails 4 and 5 which are annular with a gap, and a steel spacer-expander or space expander 6 which is annular with a gap.

Figure 5:
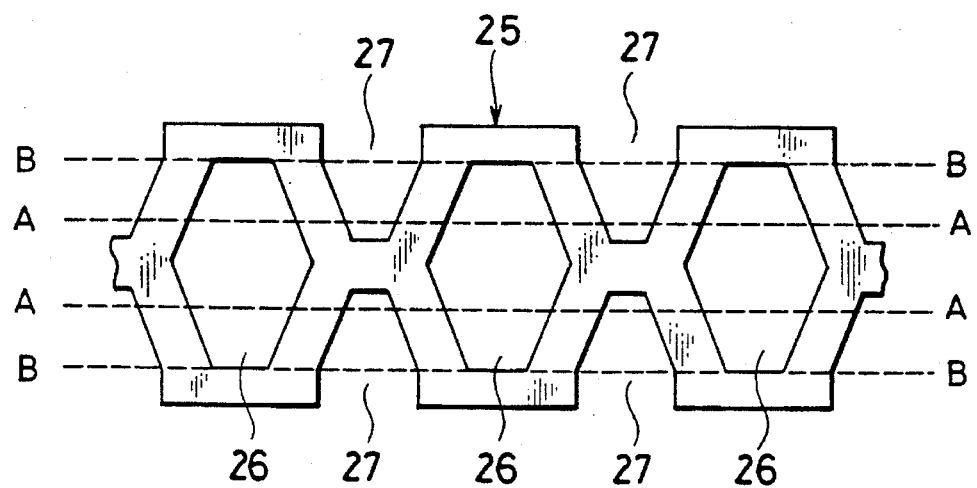
FIG. 5 is a plan view of a strip of material for a spacer-expander shown in FIG. 1.
Figure 6:
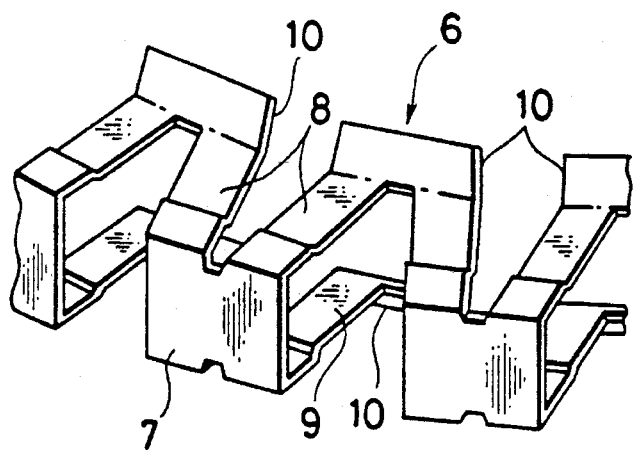
FIG. 6 is a perspective view showing a part of the spacer-expander of FIG. 1.

The spacer-expander 6 is formed from a thin steel strip 25 which is shown in FIG. 5. The strip 25 is provided with a plurality of tortoise shell-like holes 26, which serve as oil holes and are spaced in a longitudinal direction of the thin steel strip 25. Substantially V-shaped slits 27 are provided on both sides of the thin steel strip 25 between the holes 26. The strip 25 is bent along a pair of bending lines A—A into a substantially U-shaped cross section so as to constitute side rail supporting portions by upper and lower pieces 8 and 9 connected by an upright piece 7 as shown in FIGS. 1 and 6. In a further bending step, end portions are bent outwardly and obliquely along the bending lines B—B to constitute side rail pressing portions 10. The strip is then cut into a predetermined length, and formed to be annular so that the side rail pressing portions 10 are arranged at the position of the inner peripheral side. The spacer-expander 6 is compressed and fitted into the oil ring groove 2 (FIG. 1) to generate a radially outwardly expanding force. The pair of side rails 4 and 5 are axially spaced apart by the upper and lower pieces 8 and 9, and the outer sliding surfaces of the side rails 4 and 5 are uniformly pressed by the side rail pressing portions 10 and placed in close contact with the inner wall 12 of the cylinder to scrape off oil. The ends on the inner peripheral sides of the side rails 4 and 5 are pressed by the side rail pressing portions 10 and placed in close contact with the upper and lower surfaces 13 and 14 of the oil ring groove 2 to seal the upper and lower surfaces 13 and 14.

Figure 2:
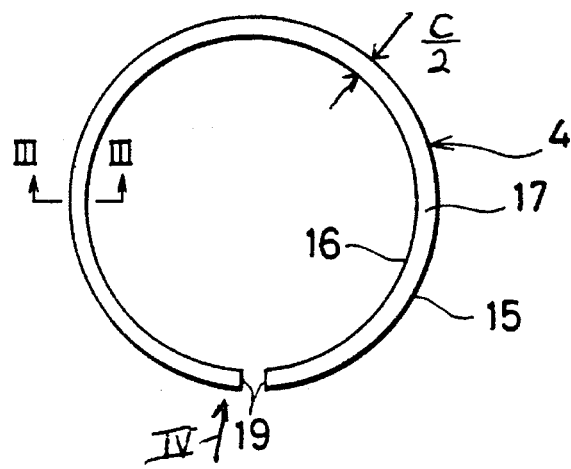
FIG. 2 is a plan view of a side rail shown in FIG. 1.
Figure 3:
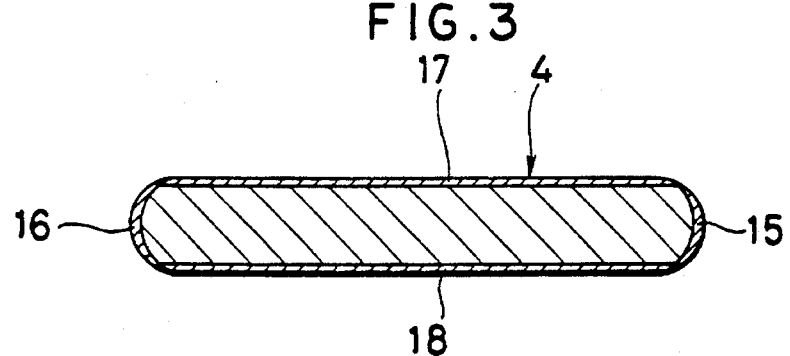
FIG. 3 is a cross sectional view taken on line III—III of FIG. 2.

As shown in FIGS. 1, 2 and 3, only the outer peripheral surfaces of the side rails 4 and 5 are provided with the ion nitriding treatment layer 15. The inner peripheral surface is provided with the hard chrome plating layer 16 and the upper and lower surfaces are provided with the soft surface treatment layers 17 and 18. It is to be noted that FIGS. 2 and 3 typically show the upper side rail 4, but the lower side rail 5 is of a similar structure. Accordingly, since only the outer peripheral surface of the side rails 4 and 5 are provided with the ion nitriding treatment layer 15, the good abrasion resistance with respect to the sliding contact with the inner wall 12 of the cylinder 11 is obtained. Since the hard chrome plating layer 16 is provided only on the inner peripheral surface, the excellent abrasion resistance with respect to the sliding contact with the side rail pressing portions 10 of the spacer expander 6 is obtained. Since the contact surface with respect to the piston I made of aluminum alloy is soft, the abnormal abrasion of the oil ring groove 2 either does not or is less likely to occur.

Figure 4:
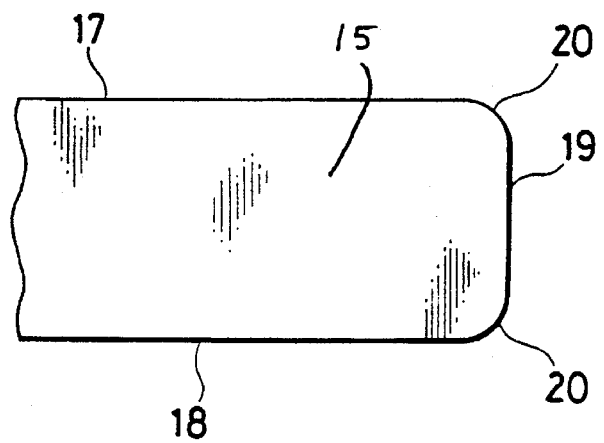
FIG. 4 is an enlarged side view, which is taken from the direction of arrow IV in FIG. 2, of one end portion of the side rail shown in FIG. 1.

As shown in FIG. 4, corner portions between an end surface 19 and each of the upper and lower surfaces of a side rail are not sharp edges, but have a chamfering over the full length of the corner portion to form a chamfered portion 20 having the radius of curvature of 0.03 mm–0.3 mm. Since the smooth chamfered portion 20 is formed as described, an occurrence of abnormal abrasion in the upper and lower surfaces 13 and 14 of the oil ring groove 2 is reduced.

Furthermore, since the hard chrome plating layer 16 on the inner peripheral surface of the side rails 4 and 5 has had a porous treatment so as to have a surface roughness of 5 μm to 20 μm, it is possible to prevent the side rails 4 and 5 from being independently rotated.

As mentioned above, when a coil is ion nitrided only at an outer peripheral surface of the coil, the outer peripheral surface of the coil generates a longer elongation as compared with the inner peripheral surface of the coil and, thus, result in a variation in the size of the outer diameter of the coil before nitriding and after nitriding so that the size of the outer diameter of the coil is substantially decreased after nitriding.

Accordingly, in the case that a side rail in which only the outer peripheral surface is ion nitrided is to be manufactured, it is necessary to accommodate the difference of the size of the outer diameter of the coil before nitriding and after nitriding. That is, the coil is required to be set on a jig in such a manner that the outer diameter of the coil is the sum of the difference of the size of the outer diameter of the coil before nitriding and after nitriding and the size of the outer diameter of the coil required after nitriding.

FIG. 7 shows a condition in which the coil is set to satisfy the aforesaid matter. Under the condition shown in FIG. 7, an ion nitriding is applied to only the outer peripheral surface of the coil and the coil is then removed from the jig with the result that the outer diameter of the coil is reduced by nitriding and the coil having the required outer diameter can be attained.

The difference of the size of the outer diameter of the coil before nitriding and after nitriding is increased either as a thickness of the nitrided layer is increased or as a thickness in a radial direction of the coil decreases or becomes thinner. A practical difference in the outer diameter of the actual coil being used before nitriding and after nitriding is generally 0.5 mm to 3 mm.

In the following tables are indicated data about the difference of the size of the outer diameter of a coil before nitriding and after nitriding. Material of coils shown in Tables 1 and 2 is a martensitic stainless steel (17% Cr SUS).

TABLE 1

Thickness of a nitrided layer: varied
Thickness in a radial direction of a coil: constant

| outer diameter of a coil on a jig mm | outer diameter of a coil required after nitriding mm | reduced amount of outer diameter of a coil before nitriding and after nitriding mm | thickness in a radial direction of a coil mm | width in an axial direction of a coil mm | thickness of a nitrided layer μm |
|---|---|---|---|---|---|
| 87.2 | 86.0 | 1.2 | 2.35 | 0.60 | 50 |
| 87.8 | 86.0 | 1.8 | 2.35 | 0.60 | 75 |
| 88.7 | 86.0 | 2.7 | 2.35 | 0.60 | 100 |

TABLE 2

Thickness in a radial direction of a coil: varied
Thickness of a nitrided layer: constant

| outer diameter of a coil on a jig mm | outer diameter of a coil required after nitriding mm | reduced amount of outer diameter of a coil before nitriding and after nitriding mm | thickness in a radial direction of a coil mm | width in an axial direction of a coil mm | thickness of a nitrided layer μm |
|---|---|---|---|---|---|
| 51.0 | 50.0 | 1.0 | 1.80 | 0.40 | 50 |
| 62.2 | 61.0 | 1.2 | 2.15 | 0.45 | 50 |
| 69.8 | 68.5 | 1.3 | 2.15 | 0.45 | 50 |
| 89.1 | 87.5 | 1.6 | 2.35 | 0.50 | 50 |

Figure 9:
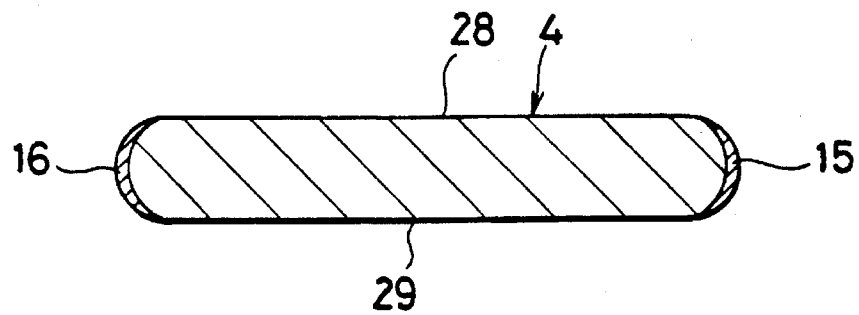
FIG. 9 is a cross sectional view similar to FIG. 3 of a modification of a side rail.

FIG. 9 shows a modified side rail according to the present invention. An ion nitriding treatment layer 15 is formed on only the outer peripheral surface of the side rail. A hard chrome plating layer 16 is formed on only the inner peripheral surface of the side rail, and the upper and lower surfaces of the side rail are untreated or bare surfaces 28 and 29.

Figure 10:
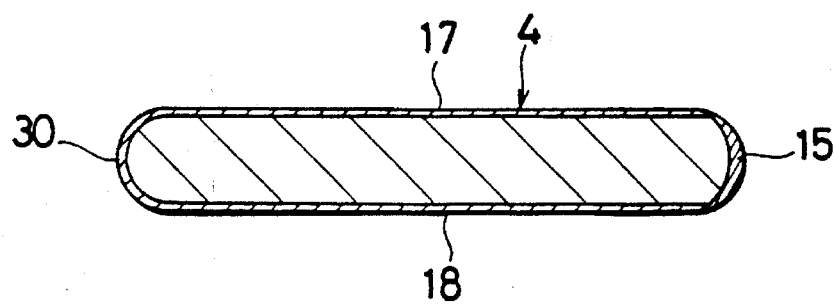
FIG. 10 is a cross sectional view similar to FIG. 3 of another modification of a side rail.

FIG. 10 shows another modified side rail according to the present invention, in which an ion nitriding treatment layer 15 is formed on only the outer peripheral surface of the side rail. Soft surface treatment layers 17, 18 and 30 are formed on the upper and lower surfaces and an inner peripheral surface of the rail.

Figure 11:
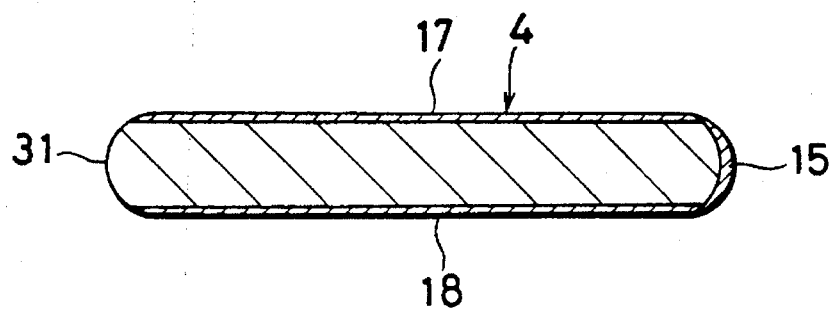
FIG. 11 is a cross sectional view similar to FIG. 3 of a further modification of a side rail.

FIG. 11 shows yet another modified side rail according to the present invention, in which an ion nitriding treatment layer 15 is formed on only the outer peripheral surface of the rail. Soft surface treatment layers 17 and 18 are formed on the upper and lower surfaces of the rail, and an inner peripheral surface of the rail is a bare or untreated surface 31.

Figure 12:
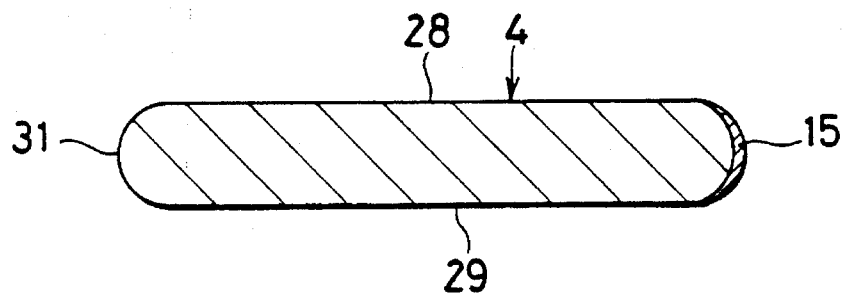
FIG. 12 is a cross sectional view similar to FIG. 3 of a still further modification of a side rail.

FIG. 12 shows still a further modified side rail according to the present invention, in which an ion nitriding treatment layer 15 is formed on only the outer peripheral surface of the rail. The upper and lower surfaces and an inner peripheral surface of the rail are untreated or bare surfaces 28, 29 and 31.

It is to be noted that while FIGS. 9–12 typically show the upper side rail 4, the lower side rail 5 is of a similar structure.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing a side rail for use in a combined oil ring having a spacer-expander and two side rails, said method comprising the steps of:

coiling a strip of rail material having a thickness C/2 to form a coil;

providing a jig with an outer peripheral surface with a diameter x=(A+B)−C, wherein B=A'−A and A is the outer diameter of the coil after nitriding and A' is the outer diameter of the coil before nitriding;

setting said coil on the outer peripheral surface of said jig and clamping the coil so that adjacent surfaces are in contact with each other and only the outer peripheral surface of the coil is exposed;

applying an ion nitriding to the exposed outer peripheral surface of the coil; and then cutting said coil into individual rails with a gap forming a pair of end surfaces.

2. A method according to claim 1, wherein B is in a range of 0.5 mm to 3 mm.

* * * * *